United States Patent [19]

Adur et al.

[11] Patent Number: 4,460,745

[45] Date of Patent: Jul. 17, 1984

[54] ADHESIVE THREE-COMPONENT BLENDS CONTAINING GRAFTED HDPE

[75] Inventors: Ashok M. Adur, Elk Grove Village; Seymour Schmukler, Palatine; John Machonis, Jr., Schaumburg; Mitsuzo Shida, Barrington, all of Ill.

[73] Assignee: Chemplex Company, Rolling Meadows, Ill.

[21] Appl. No.: 372,209

[22] Filed: Apr. 26, 1982

[51] Int. Cl.$^3$ .................. C08L 51/06; C08L 23/26; C08L 23/04; C08L 23/16
[52] U.S. Cl. .................................. 525/74; 525/77; 525/78; 525/193; 525/75
[58] Field of Search ............... 525/74, 193, 77, 78, 525/75

[56] References Cited

U.S. PATENT DOCUMENTS 3,856,889 12/1974 McConnell .................... 525/74
4,087,587 5/1978 Shida et al. .................... 525/74
4,230,830 10/1980 Tanny et al. .................... 525/193
4,394,485 7/1983 Adur .................... 525/74

FOREIGN PATENT DOCUMENTS 2081723 2/1982 United Kingdom .................. 525/74

Primary Examiner—Carman J. Seccuro
Attorney, Agent, or Firm—Wood, Dalton, Phillips, Mason & Rowe

[57] ABSTRACT

Composites of matter having properties that make them strong adhesives to various substrates, especially to polar substrates. These adhesive blends comprise medium density polyethylene, linear low density polyethylene and a high density polyethylene grafted with or containing in its main chain unsaturated or saturated carboxylic acids or derivatives. The disclosure also includes composite structures having one or more substrates with the adhesive blend adhered thereto and to methods of making these composites.

4 Claims, No Drawings

ADHESIVE THREE-COMPONENT BLENDS CONTAINING GRAFTED HDPE

BACKGROUND OF THE INVENTION

Blends of high density polyethylene (HDPE) or ethylene-vinyl acetate copolymers (EVA) with a high density polyethylene grafted with suitable unsaturated carboxylic acid or acid derivatives are known to give adhesion to polar polymers such as Nylon 6 (U.S. Pat. Nos. 4,087,587 and 4,087,588).

However, such blends have one or more of the following disadvantages: the multi-layer structure tends to come apart in boiling water or when frozen, the adhesive blend often has low clarity, and sometimes the adhesion of the blend to either substrate tends to be inferior.

The improvements achieved by this invention include: excellent bond strength to the substrate or substrates, adhesion stability both in boiling water and when frozen, good clarity, economic advantages due to eliminating the need to use costly highly polar copolymers of polyolefins, and elimination of the need for additional adhesive layers when bonding unmodified polyolefins to dissimilar substrates.

SUMMARY OF THE INVENTION

A feature of this invention is to provide adhesive blends comprising modified polyolefin resins in which the blends have improved adhesion to substrates and especially polar substrates such as metals, glass, paper, wood and polar polymers such as polyamides, polyurethanes, copolymers of olefins with vinyl esters (as such or saponified), polycarbonates, etc. These blend resins are high melting and the composite structures formed with these resins do not change shape or form when immersed in boiling water. These resins can be used in any conventional process that is used to combine dissimilar materials. Examples of these processes are lamination, coextrusion, powder coating, extrusion coating, blow molding, etc.

BRIEF DESCRIPTION OF THE PREFERRED EMBODIMENTS

The blends of this invention include the following components: (A) polyethylene of medium density (MDPE), (B) linear low density polyethylene, and (C) high density polyethylene (HDPE) grafted with or containing in its main chain unsaturated or saturated carboxylic acids or derivatives such as anhydrides, esters, amides and the like. The addition of the linear low density polyethylene blending component surprisingly aids the blend in adhering to the polar substrate.

The novel blends have excellent adhesive strength to polyolefins and to various substrates including polar polymers like nylons and other polyamides, ethylene-vinyl alcohol copolymers, ethylene-vinyl ester copolymer, polyesters, polyvinyl alcohol, polyurethanes, polyureas and other carbonyl-containing polymers, metal, glass, paper, wood and the like. Examples of metals are aluminum, steel, copper, iron and the like.

Composite structures including these blends may be made by any methods commonly used. Examples of such methods are coextrusion, lamination, coating or a combination of these methods or any other method known to those skilled in the art.

The resulting composite structure can be in the form of films, containers, sheets, bottles, tubes, etc.

The term "unsaturated carboxylic acids or acid derivatives" used for grafting includes unsaturated carboxylic acids, anhydrides, esters, amides and any other acid derivatives.

The term "high density polyethylene" (HDPE) used herein for the grafting backbone includes homopolymers of ethylene and its copolymers with propylene, butene, hexene, octene, and other unsaturated aliphatic hydrocarbons. Preferably, such high density polyethylene has a density of 0.930–0.970 g/cc. Also, it is sometimes preferable to graft onto blends of two or more of the above homopolymers and copolymers.

The term "medium density polyethylene" (MDPE) used as one of the blending components includes ethylene polymers in the density range of 0.93–0.94 g/cc, which are branched and usually produced under high pressure conditions.

The term "linear low density polyethylene" (LLDPE) used as the other blending component includes copolymers of ethylene with one or more of propylene, butene, hexene, 4-methyl pentene-1, octene-1 and other unsaturated aliphatic hydrocarbons in the density range of 0.91–0.94 g/cc and a melting peak range of 100°–135° C. These LLDPE resins are generally prepared using transition metal catalysts such as compounds of titanium, aluminum, chromium and the like. It is preferable to use a 0.91–0.93 g/cc density LLDPE of metal index 0.5–5 g/10 min. for this invention.

These linear low density polyethylenes have a unique set of properties which distinguish them from both conventional low density polyethylene (LDPE) resins and high density polyethylene resins. Because of the methods by which low density polyethylenes are prepared, they are highly branched materials which have a tendency to coil on themselves. The linear low density materials, on the other hand, as their name indicates, have very little of this long-chain branching and have on the backbone just short-chain branches introduced by the use of a comonomer.

This linear structure allows the polymer to stretch out better and also to blend more easily with other polymers. The range of density for linear low density polyethylenes is from about 0.91 to 0.939 g/cc. This distinguishes LLDPE from HDPE which range from 0.94 to 0.97 g/cc. The structure of the linear low density polyethylenes differs from the high density materials by the fact that they contain considerably more of the comonomer than the high density polyethylene copolymers leading to a high degree of short-chain branching. This difference in structure causes their properties to differ from those of HDPE and LDPE.

Linearity leads to good tensile and tear properties while branching yields toughness, puncture resistance and tear strength, low temperature impact, low warpage and excellent environmental stress crack resistance. These differences from conventional low density polyethylene and high density polyethylene have caused LLDPE to be called a third generation of polyethylene—a different material, actually a hybrid with its own set of properties. Because it has its own set of properties, one cannot per se extrapolate and predict the properties of this material, when combined with other polymers, on the basis of the behavior of HDPE or LDPE in blends. Hence, it was surprising to note that these materials, when used as the backbone in the graft copolymers, are able to yield properties which are not possible with backbones of LDPE or HDPE.

The unsaturated carboxylic acids or acid anhydrides used as the grafting monomers include compounds such as acrylic acid, methacrylic acid, fumaric acid, maleic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthalic anhydride, x-methylbicyclo(2.2.1)hept-5-ene-2,3-dicarboxylic acid anhydride, x-methylnorborn-5-ene-2,3-dicarboxylic acid anhydride, norborn-5-ene-2,3-dicarboxylic acid anhydride, Nadic anhydride, methyl Nadic anhydride, Himic anhydride, methyl Himic anhydride and other fused ring monomers described in U.S. Pat. Nos. 3,873,643 and 3,882,194, both assigned to the assignee hereof.

Cografting monomers as described in U.S. Pat. No. 3,882,194 are also useful for preparing the graft copolymers of this invention.

Including among the conjugated unsaturated esters suitable for cografting are dialkyl maleates, dialkyl fumarates, dialkyl itaconates, dialkyl mesaconates, dialkyl citraconates, alkyl acrylates, alkyl crotonates, alkyl tiglates and alkyl methacrylates where alkyl represents aliphatic, aryl-aliphatic and cycloaliphatic groups containing 1-12 carbon atoms. Esters particularly useful in the cografted copolymers of this invention are dibutyl maleate, diethyl fumarate and dimethyl itaconate. Among the acids and acid anhydrides particularly useful in the cografted copolymers of this invention are maleic anhydride, fumaric acid, x-methylbicyclo(2.2.1-)hept-5-ene-2,3-dicarboxylic acid anhydride and bicyclo(2.2.1)hept-5-ene-2,3-dicarboxylic acid anhydride.

It is often desirable to use more than one monomer in either or both classes of monomers in order to control the physical properties of the final products. The method in general consists of heating a mixture of the polymer or polymers and the monomer or monomers with or without a solvent. The mixture can be heated to above the melting point of the polyolefin with or without a catalyst. Thus, the grafting occurs in the presence of air, hydroperoxides, other free radical catalysts or preferably in the essential absence of those materials where the mixture is maintained at elevated temperatures and (if no solvent is used) preferably under high shear.

A convenient method of accomplishing the reaction is to premix the ingredients and then extrude the composition through a heated extruder. Other mixing means, such as a Brabender mixer, a Banbury mixer, roll mills and the like may also be employed for the process. In order to prevent undue increase in molecular weight with a possibility of some crosslinking at elevated temperatures, it is desirable to carry out the reaction in a closed vessel. A conventional single or multiple screw extruder accomplishes this result without the use of auxiliary equipment and for this reason is a particularly desirable reaction vessel.

The graft and cografted copolymers are recovered by any method or system which separates or utilizes the graft copolymer that is produced. Thus, the term includes recovery of the copolymer in the form of precipitated fluff, pellets, powders and the like, as well as further chemically reacted or blended pellets, powders and the like or in the form of shaped articles formed directly from the resulting copolymer.

The resulting copolymers are found to consist of about 70-99.95 wt.% of polyethylene and about 0.05-30 wt.% of the unsaturated acid or acid anhydride or mixtures.

The cograft copolymers consist of about 50-99.9 wt.% of polyolefin, about 0.05-25 wt.% of the unsaturated acid or acid anhydride or mixtures thereof and about 0.05-25 wt.% of the unsaturated ester and mixtures thereof. These resulting graft copolymers are capable of being blended or reacted with a wide variety of other materials to modify the copolymer further.

Adhesive blends of this invention can be used in composites containing polar substrates such as nylon, ethylene vinyl alcohol copolymers (EVOH), polyvinyl alcohol (PVA), polyester, polyurethane, metals, etc. These compositions can be just two layers or they can be three or more layers with materials which adhere to either layer being added to the structure. For instance, polyolefins like polyethylene (PE) comonomers, ionomers, ethylene vinyl acetate copolymers (EVA) or ethylene copolymers with other monomers and polypropylene (PP) can be used in these layers. It is obvious that many combinations can be made by one skilled in the art of using the principles disclosed.

The methods for this joining can be lamination, coextrusion, extrusion lamination, coextrusion coating or any other method for joining dissimlar materials to form composite structures known to those skilled in the art.

Some examples of these composites are: adhesive of this invention/nylon, adhesive/polyethylene, adhesive/polyester, adhesive/ethylene-vinyl acetate copolymer, adhesive/ethylene-vinyl alcohol copolymer, adhesive/aluminum, adhesive/steel, adhesive/glass, adhesive/wood, adhesive/leather, polyolefin/adhesive/nylon, polyolefin/adhesive/EVOH, polyolefin/ionomer/adhesive/nylon, adhesive/nylon/adhesive/polyolefin, polyolefin/adhesive/EVOH/adhesive/polyolefin, polyolefin/-adhesive/polyester, EVA/adhesive/EVOH, EVA/adhesive/polyesters, polyolefin/adhesive/polyester/adhesive, and polyolefin/adhesive/polyester/adhesive/polyolefin.

Examples of other combinations are aluminum/adhesive/aluminum or adhesive/aluminum/adhesive or polyolefin/adhesive/aluminum/adhesive/polyolefin. Other metals such as copper, steel, brass, etc. can also be used. Dissimilar metal examples are: aluminum/adhesive/copper, aluminum/adhesive/steel, aluminum/adhesive/brass, etc. One could also have combinations in which one has a metal/adhesive/polar polymer. Examples of these would be aluminum/adhesive/nylon or aluminum/adhesive/EVOH, or steel/adhesive/nylon/adhesive/steel. Here again, one skilled in the art can find a number of obvious combinations from the principles described above.

The composites of this invention can be used to manufacture many different useful articles. They can be used as packaging films, blow molded bottles, coextruded sheet which can be thermoformed into container, coatings on glass bottles or wood or metal or even to join two metals, either the same metal or dissimilar metals, into a lamination.

In preparing the blends in the examples below from the above graft copolymers, medium density ethylene polymers and linear low density polyethylene, any blending equipment or technique may be used. As an example, blends can be prepared in an electrically heated Brabender Plasticorder mixing head using a scroll type mixer under the following conditions: temperature—325° F., rotor speed—120 rpm and mixing time—10 minutes after flux.

All blends preferably contain an antioxidant package.

In most of the specific examples, the resultant blends were compression molded into films approximately 0.005–0.007 inches thick. The films were then heat sealed to the substrate under evaluation at an appropriate temperature and time.

EXAMPLES

Example 1

An electrically heated Brabender mixing unit is used for blending a low density polyethylene resin of a melt index of 3 g/10 min. and a density of 0.932 g/cc with a linear low density polyethylene resin of a melt index 2.5 g/10 min. and a density of 0.918 g/cc along with a high density polyethylene resin of melt index 1.5 g/10 min. and a density of 0.95 g/cc grafted with an anhydride such as that of x-methyl bicyclo(2.2.1)hept-5-ene-2,3-dicarboxylic acid. The blends are tested for adhesion to nylon film. The adhesion was carried out on a Sentinel heat-sealer set at 430° F. and 1 sec. The results obtained are summarized below:

| MDPE | LLDPE | Graft Copolymer | Adhesion to Nylon 430° F., 1 sec. lbs/in. |
| --- | --- | --- | --- |
| 100 | 0 | 0 | 0.0 |
| 90 | 0 | 10 | 1.4 |
| 80 | 10 | 10 | 3.2 |
| 75 | 15 | 10 | >4.0 |
| 70 | 20 | 10 | >5.4 |
| 60 | 30 | 10 | >6.9 |
| 50 | 40 | 10 | >5.2 |
| 45 | 45 | 10 | >4.4 |
| 30 | 60 | 10 | >6.3 |
| 10 | 80 | 10 | 4.2 |
| 0 | 90 | 10 | 5.3 |

EXAMPLE 2

The following were used for blending: a medium density polyethylene resin of melt index of 3 g/10 min. and a density of 0.932 g/cc with a linear low density polyethylene resin of melt index 1.1 and a density of 0.919 along with a high density polyethylene resin grafted with x-methyl bicyclo(2.2.1)hept-5-ene-2,3-dicarboxylic acid anhydride such that the grafted HDPE has a melt index of 1.5 and a density of 0.95. The blends were tested for adhesion to nylon 6 at 430° F. and 1 sec. heat sealing conditions. The results obtained are as follows:

| MDPE | LLDPE | Graft Copolymer | Adhesion to Nylon 0.0 lbs/in. |
| --- | --- | --- | --- |
| 100 | 0 | 0 | 0.0 |
| 90 | 0 | 10 | 1.4 |
| 80 | 10 | 10 | >4.7 |
| 70 | 20 | 10 | >8.2 |
| 60 | 30 | 10 | >5.3 |
| 50 | 40 | 10 | >5.5 |
| 30 | 60 | 10 | >6.1 |
| 0 | 90 | 10 | >6.5 |

Example 3

A blend of 60% of the medium density polyethylene of melt index of 3 g/10 min. and a density of 0.932 g/cc with 30% of linear low density polyethylene of melt index 2.5 g/10 min. and a density of 0.918 g/cc along with 10% of HDPE grafted with x-methyl bicyclo(2.2.1)hept-5-ene-2,3-dicarboxylic acid anhydride when pressed into film gave an adhesion of over 6.6 lbs/in. to a film made from a polyethylene of density 0.93 g/cc and a melt index of 3 g/10 min. The heat-sealer was set at 430° F. and 1 sec. for sealing the two films into a composite.

Example 4

Blends made from medium density polyethylene of melt index 3 g/10 min. and a density of 0.932 g/cc with a linear low density polyethylene of melt index 2.5 g/10 min. and density of 0.918 g/cc along with a high density polyethylene resin grafted with x-methyl bicyclo(2.2.1)hept-5-ene-2,3-dicarboxylic acid anhydride gave the following adhesion values to a film of ethylene-vinyl alcohol copolymer also known as saponified ethylene-vinyl alcohol copolymer (EVOH).

| MDPE | LLDPE | HDPE g | Adhesion to EVOH* lbs/in. |
| --- | --- | --- | --- |
| 75 | 15 | 10 | 3.9 |
| 60 | 30 | 10 | 3.1 |

*Adhesion carried out on a sample heat-sealed on a Sentinel sealer set at 430° F. and 1 second

Example 5

A blend containing 70 wt.% medium density polyethylene, used in Example 1, 20 wt.% linear low density polyethylene of density 0.92 g/cc and of melt index 2.0 g/10 min. and 10 wt.% of high density polyethylene graft copolymer used in Example 1, and an antioxidant package, was prepared in a Banbury mixer and coextruded with nylon 6. The coextruded cast films obtained had a total thickness of 3.0 mil and the bond was inseparable.

Example 6

The coextruded cast film which was prepared as in Example 5 was immersed in boiling water for 1 hour. The film still could not be separated into two layers. Also the shape of the film was intact showing that a bag made of such a film could be used for a boil-in-bag application.

Example 7

A blend consisting essentially of 60 wt.% of the medium density polyethylene, used in Example 1, 30 wt.% of the linear low density polyethylene used in Example 5 and 10 wt.% of a high density polyethylene grafted with maleic anhydride gave an adhesion value of 3.3 lbs/in. with a nylon film when tested on the heat sealer set at 430° F. and 1 sec.

Glossary of Terms

EVA—ethylene-vinyl acetate copolymers
EVOH—ethylene-vinyl alcohol copolymers
HDPE—high density polyethylene
HDPEg—HDPE graft copolymer
LDPE—low density polyethylene
LLDPE—linear low density polyethylene
MDPE—medium density polyethylene
PP—polypropylene

We claim:

1. An adhesive blend consisting essentially of:
   (A) medium density polyethylene comprising a branched ethylene homopolymer having a density of about 0.93–0.94 g/cc;
   (B) linear low density polyethylene comprising a copolymer of ethylene and an unsaturated aliphatic hydrocarbon having a density of about 0.91–0.94 g/cc; and
   (C) a HDPE polymer comprising a linear homopolymer or copolymer of ethylene having a density of about 0.94–0.97 g/cc grafted with carboxylic acids or derivatives.

2. The blend of claim 1 wherein said linear low density polyethylene of (B) comprises copolymers of ethylene with one or more of propylene, butene, hexene, 4-methyl pentene-1 or octene-1.

3. The blend of claim 1 wherein said linear low density polyethylene copolymer has a melt index of about 0.5–5 g/10 min.

4. The blend of claim 1 wherein said carboxylic acids or acid derivatives of (C) comprise carboxylic acids, acid anhydrides, esters, amides and other carboxylic acid derivatives.

* * * * *

UNITED STATES PATENT AND TRADEMARK OFFICE
CERTIFICATE OF CORRECTION

PATENT NO. : 4,460,745

DATED : July 17, 1984

INVENTOR(S) : Ashok M. Adur et al

It is certified that error appears in the above-identified patent and that said Letters Patent is hereby corrected as shown below:

Column 5, line 15 delete "low density" and insert -- medium density -- in lieu thereof.

Signed and Sealed this

Second Day of April 1985

[SEAL]

*Attest:*

DONALD J. QUIGG

*Attesting Officer*      *Acting Commissioner of Patents and Trademarks*